US008838507B2

(12) United States Patent
Camerer et al.

(10) Patent No.: US 8,838,507 B2
(45) Date of Patent: Sep. 16, 2014

(54) ACTIVE LEARNING DECISION ENGINES

(75) Inventors: Colin Camerer, Pasadena, CA (US);
Daniel Golovin, Pittsburgh, PA (US);
Andreas Krause, Zurich (CH);
Debajyoti Ray, Marina del Ray, CA (US)

(73) Assignee: California Institute of Technology, Pasadena, CA (US)

( * ) Notice: Subject to any disclaimer, the term of this patent is extended or adjusted under 35 U.S.C. 154(b) by 227 days.

(21) Appl. No.: 13/414,371

(22) Filed: Mar. 7, 2012

(65) Prior Publication Data

US 2012/0233100 A1    Sep. 13, 2012

Related U.S. Application Data

(60) Provisional application No. 61/450,035, filed on Mar. 7, 2011.

(51) Int. Cl.
*G06F 15/18* (2006.01)
*G06N 7/00* (2006.01)

(52) U.S. Cl.
CPC ........................... *G06N 7/005* (2013.01)
USPC .......................................................... 706/12

(58) Field of Classification Search
None
See application file for complete search history.

(56) References Cited

PUBLICATIONS

Bellala, et al. "Group-based query learning for rapid diagnosis in time-critical situations." arXiv preprint arXiv:0911.4511 (Nov. 2009) [retrieved Nov. 19, 2013]. [retrieved from arxiv.org].*

Dasgupta, S. "Coarse sample complexity bounds for active learning." Advances in neural information processing systems. 2005 [retrieved Dec. 9, 2013]. [retrieved from machinelearning.wustl.edu].*
Dasgupta, S et al. "A general agnostic active learning algorithm." Advances in neural information processing systems. 2007 [retrieved Dec. 11, 2013]. [Retrieved from machinelearning.wustl.edu].*
Nowak, Robert. "Noisy generalized binary search." Advances in neural information processing systems. 2009 [retrieved Nov. 13, 2013]. [retrieved from machinelearning.wustl.edu].*
Streeter, M. et al. An online algorithm for maximizing submodular functions. No. CMU-CS-07-171. Carnegie-Mellon Univ Pittsburgh PA School of Computer Science, 2007 [retrieved Nov. 13, 2013]. [retrieved from machinelearning.wustl.edu].*
Balcan et al., "Agnostic Active Learning", ICML, 2006, 8 pgs.
Bellala et al., "Extensions of Generalized Binary Search to Group Identification and Exponential Costs", Advances in Neural Information Processing Systems (NIPS) 2010, 9 pgs.

(Continued)

*Primary Examiner* — Kakali Chaki
*Assistant Examiner* — Eric Nilsson
(74) *Attorney, Agent, or Firm* — KPPB LLP

(57) ABSTRACT

Systems and methods for active learning decision engines in accordance with embodiments of the invention are disclosed. In one embodiment of the invention, an active learning decision engine includes equivalence class storage, hypotheses storage, edge storage, test storage, where tests are related to hypotheses, observation storage; and a processor, where the processor is configured to determine a plurality of equivalence classes containing one or more hypotheses, determine a set of edges utilizing tests, where the edges in the set of edges span hypotheses in distinct equivalence classes, determine weights for the determined edges, select a test based on the determined weights, perform the selected test and observe the results of the performed test, remove edges from the set of edges utilizing the observed results, and select a hypothesis from the one or more hypotheses using the set of edges.

24 Claims, 5 Drawing Sheets

(56) References Cited

PUBLICATIONS

Chakaravarthy et al., "Decision Trees for Entity Identification: Approximation Algorithms and hardness Results", Proceedings of the ACM—SIGMOD Symposium on Principles of Database Systems, 2007, 10 pgs.

Chaloner et al., "Bayesian Experimental Design: A Review", Statistical Science, Aug. 1995, vol. 10, No. 3, 69 pgs.

Dasgupta, "Analysis of a greedy active learning strategy", ICML, 2006, 8 pgs.

Golovin et al., "Adaptive Submodularity: Theory and Applications in Active Learning and Stochastic Optimization", Journal of Artificial Intelligence Research, 2010, 53 pgs.

Guillory et al., "Average-Case Active Learning with Costs", 20th International Conference on Algorithmic Learning Theory, University of Porto, Portugal, Oct. 2009, 14 pgs.

Hanoch et al., "Efficient Portfolio Selection with Quadratic and Cubic Utility", The Journal of Business, 1970, vol. 43, No. 2, 181-189.

Howard, "Information Value Theory", IEEE Transactions on Systems Science and Cybernetics, Aug. 1966, vol. SSC-2, No. 1, pp. 22-26.

Kahneman et al., "Prospect Theory: An Analysis of Decision Under Risk", Econometrica, Mar. 1979, vol. 47, No. 2, pp. 263-292.

Kosaraju et al., "On an Optimal Split Tree Problem", WADS '99, Proceedings of the 6th International Workshop on Algorithms and Data Structures, 1999, pp. 157-168.

Krause et al., "Optimal Value of Information in Graphical Models", Journal of Artificial Intelligence Research, 2009. vol. 35, pp. 557-591.

Lindley, "On a Measure of the Information Provided by an Experiment", Annals of Mathematical Statistics, 1956, vol. 27, pp. 986-1005.

Mackay, "Information-Based Objective Functions for Active Data Selection", Neural Computation, 1992, vol. 4, pp. 590-604.

Pratt, "Risk Aversion in the Small and in the Large", Econometrica, Jan.-Apr. 1964, vol. 32, No. 1-2, pp. 122-136.

Prelec, "The Probability Weighting Function", Econometrica, May 1998, vol. 66, No. 3, pp. 497-527.

Zheng et al., "Efficient Test Selection in Active Diagnosis via Entropy Approximation", UAI '05 Proceedings of the 21st Conference in Uncertainty in Artificial Intelligence, 2005, 8 pgs.

* cited by examiner

ACTIVE LEARNING DECISION ENGINES

CROSS-REFERENCE TO RELATED APPLICATIONS

The current application claims priority to U.S. Provisional Patent Application No. 61/450,035, filed Mar. 7, 2011, the disclosure of which is incorporated herein by reference.

FEDERAL FUNDING SUPPORT

This invention was made with government support under CNS0932392 and IIS0953413 awarded by the National Science Foundation and N00014-09-1-1044 awarded by the Office of Naval Research. The government has certain rights in the invention.

FIELD OF THE INVENTION

The present invention generally relates to systems and methods for Bayesian active learning and more specifically relates to systems and methods for Bayesian active learning with noisy observations.

BACKGROUND

Given a hypothesis to evaluate, Bayesian inferences are used to enable reasoning about the hypothesis utilizing prior knowledge based on a set of tests on the hypothesis. In Bayesian inferences, a hypothesis is a proposition whose truth or falsity is utilized to determine an answer to a problem or a problem set. By iteratively running tests and applying the result of the test to the prior knowledge, an answer to the hypothesis, in the form of a probability of truth or falsity, can be determined. For a hypothesis A and evidence B, the probability of B given A is:

$$P(A\mid B) = \frac{P(B\mid A)P(A)}{P(B)}$$

Where P(A) is the initial degree of belief in A, P(A|B) is the degree of belief in A having accounted for B, and P(B|A)/P(B) is the support B provides for A. P(A) is commonly known as the prior and P(A|B) is commonly known as the posterior.

It is possible to calculate P(A|B) by running every test for a hypothesis or hypotheses, however, in practice it is too time and resource intensive to run every test. One process commonly used to determine an answer to a hypothesis or hypotheses using a subset of the available tests is generalized binary search (GBS). In GBS, tests are greedily selected to maximize the value of the information obtained by running the tests, as measured by the information gain criteria. Information gain is a formal measure of the utility of the information obtained from a test. In this way, fewer than all tests can be run in order to determine the likelihood of a hypothesis or hypotheses.

SUMMARY OF THE INVENTION

Systems and methods for active learning decision engines in accordance with embodiments of the invention are disclosed. In one embodiment of the invention, an active learning decision engine includes equivalence class storage configured to store equivalence classes, hypotheses storage configured to store hypotheses, edge storage configured to store edges, test storage configured to store tests, where the tests are related to hypotheses, observation storage configured to store observations; and a processor, where the processor is configured to determine a plurality of equivalence classes containing one or more hypotheses, where the plurality of equivalence classes are a partition of the hypotheses in the hypotheses storage, determine a set of edges utilizing tests, where the edges in the set of edges span hypotheses in distinct equivalence classes, determine weights for the determined edges, select a test based on the determined weights, perform the selected test and observe the results of the performed test, remove edges from the set of edges utilizing the observed results, and select a hypothesis from the one or more hypotheses using the set of edges.

In another embodiment of the invention, the processor is configured to select tests based on the determined weights by greedily maximizing the determined weights of the selected tests.

In an additional embodiment of the invention, greedily maximizing the determined weights of the selected tests is strongly adaptively monotone.

In yet another embodiment of the invention, greedily maximizing the determined weights of the selected tests is adaptively submodular.

In still another embodiment of the invention, the processor is configured to select tests to minimize the expected cost of the tests.

In yet still another embodiment of the invention, the observations of performed tests are noisy observations.

In yet another embodiment of the invention, the processor is configured to select a hypothesis from the set of hypothesis based on the observations of performed tests by minimizing the expected risk of loss of selecting the hypothesis based on the observed outcomes of the performed tests.

In still another embodiment of the invention, the processor is configured to determine the plurality of equivalence classes using the observations of performed tests.

In yet still another embodiment of the invention, the performed tests related to the hypotheses in the same equivalence class lead to the same minimized expected risk of loss.

Yet another embodiment of the invention includes selecting a hypothesis from a set of hypotheses using an active learning decision engine, involving determining a plurality of equivalence classes using the active learning decision engine, where an equivalence class contains one or more hypotheses, determining a set of weighted edges using the active learning decision engine, where the weighted edges connect hypotheses in different equivalence classes and the weighted edges represent tests related to the connected hypotheses, removing weighted edges from the set of weighted edges which maximizes the computed expected reduction in weight using the active learning decision engine, observing the outcome of remaining tests associated with the weighted edges using the active learning decision engine, and selecting a hypothesis from the set of hypotheses based on the observed outcome using the active learning decision engine.

In another embodiment of the invention, removing weighted edges from the set of weighted edges greedily maximizes the weights of the weighted edges that are removed.

In yet another embodiment of the invention, greedily maximizing the weights of the weighted edges representing the selected tests is strongly adaptively monotone.

In still another embodiment of the invention, greedily maximizing the weights of the weighted edges representing the selected tests is adaptively submodular.

In yet still another embodiment of the invention, the computed expected reduction in weight of the weighted edges removed from the set of weighted edges is a monotonically increasing function.

In yet another embodiment of the invention, the observed result of the selected test is a noisy observation.

In still another embodiment of the invention, selecting a hypothesis from the set of hypothesis based on the observed outcome involves minimizing the expected risk of loss of selecting the hypothesis based on the observed outcome of the selected test.

In yet still another embodiment of the invention, determining equivalence classes containing one-or more hypotheses includes determining the equivalence classes using the outcomes of the tests related to the one or more hypotheses.

In yet another embodiment of the invention, the tests related to the hypotheses in the same equivalence class lead to the same minimized expected risk of loss.

Yet still another embodiment of the invention includes selecting hypothesis from a set of hypotheses determined using observations of selected tests using an active learning decision engine involving selecting a hypothesis from the set of hypotheses using the active learning decision engine, for each test related to the selected hypothesis, selecting a test to run using the active learning decision engine, where the test is related to the selected hypothesis, running the selected test and observing the result of the selected test using the active learning decision engine, and computing the expected reduction in weight utilizing the observed result using the active learning decision engine, selecting the test which maximizes the computed expected reduction in weight using the active learning decision engine, adding the selected test to the answer using the active learning decision engine, observing the outcome of the selected test using the active learning decision engine, and selecting a hypothesis from the set of hypotheses using the observed outcome using the active learning decision engine.

In another embodiment of the invention, selecting the test which maximizes the computed expected reduction in weight greedily maximizes the computed expected reduction in weight.

In yet another embodiment of the invention, greedily maximizing the computed expected reduction in weight is strongly adaptively monotone.

In still another embodiment of the invention, greedily maximizing the computed expected reduction in weight is adaptively submodular.

In yet still another embodiment of the invention, computing the expected reduction in weight is a monotonically increasing function.

In yet another embodiment of the invention, observing the result of the selected test is a noisy observation.

DETAILED DESCRIPTION

Figure 1:
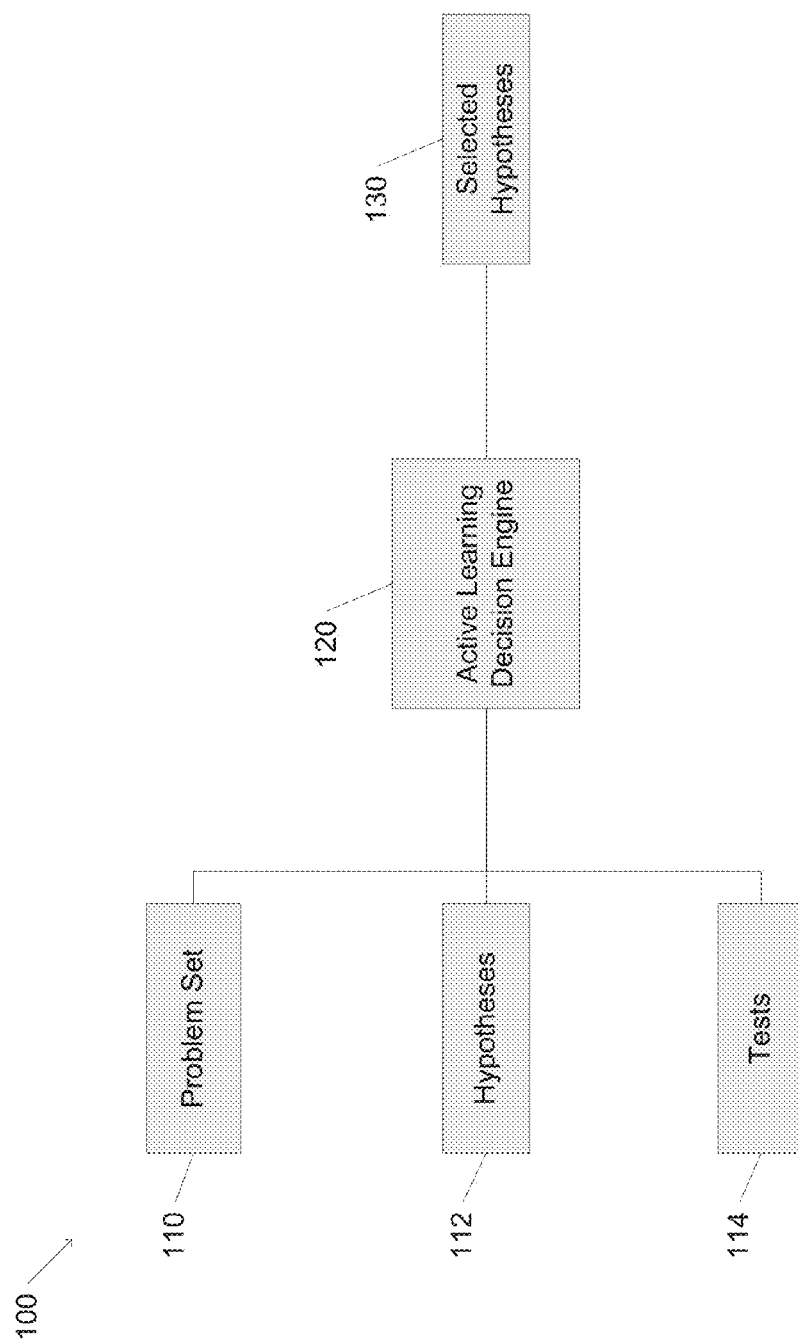
FIG. 1 is a diagram of a system utilizing an active learning decision engine in accordance with an embodiment of the invention.

Turning now to the drawings, active learning decision engines in accordance with embodiments of the invention are disclosed. The problem of finding an optimal hypothesis or hypotheses is NP-Hard, as is approximating finding an optimal hypothesis or hypotheses. Generalized Binary Search (CBS) is an approximation of an optimal policy for finding an optimal hypothesis or hypotheses in certain cases. In an ideal case with noiseless observations (the Optimal Decision Tree problem) using GBS, the expected number of tests needed to reach an answer is a factor of O(OPT*log n), where n is the number of hypotheses and OPT is the expected number of tests needed for the optimal policy. However, GBS is an approximation of an optimal policy finder and is not guaranteed to find the optimal policy. In the real world, the observations resulting from the running of tests are noisy, in that running the test may not result in the correct answer or as strong of an answer as the answer would be in an ideal noiseless situation. When dealing with noisy observations, there may not be sufficient tests in order to determine an optimal policy with 100% certainty. GBS is only capable of giving a guaranteed answer when an optimal policy can be determined with 100% certainty, making GBS poorly suited for dealing with noisy observations.

In order to deal with noisy observations, it is desirable to reduce the number of noisy observations to make the remaining observations noiseless. In order to reduce the noisy active learning problem to a noiseless active learning problem, the hypotheses are partitioned into equivalence classes connected by weighted edges representing the tests associated with the hypotheses, and then the equivalence class in which the true hypothesis lies is determined. This problem is called the Equivalence Class Determination (ECD) problem and is described in "Near-Optimal Bayesian Active Learning with Noisy Observations" by Golovin et al. (arXiv:1010.3091v1 [cs.LG] 15 Oct. 2010, available online), the entirety of which is incorporated by reference. By partitioning the hypotheses into equivalence classes and then cutting the edges connecting the equivalence classes, determined by running tests, the true hypothesis or hypotheses emerge. In many embodiments, the true hypothesis or hypotheses are the most likely hypothesis to answer a problem set. By converting the noisy observations into noiseless observations by solving the ECD problem, determining the true hypothesis or hypotheses can be done with performance approximate to the optimal policy.

Equivalence class edge cutting (EC2) methods are utilized in order to determine a solution to the ECD problem. In accordance with embodiments of the invention, active learning decision engines receive problems, hypotheses, and tests; the active learning decision engine then finds a set of hypotheses as an answer to the problem utilizing EC2 methods. Systems and methods for active learning decision engines in accordance with embodiments of the invention are discussed below.

System Overview

An overview of an active learning decision engine in accordance with an embodiment of the invention is illustrated in FIG. 1. The overview 100 includes a problem set 110, hypotheses 112, and tests 114. In many embodiments, the problem set 110 is a problem posed in a research activity, such as which scientific theory is the most accurate among competing theories, which economic model describes a set of data, analyzing and predicting results in empirical behavioral economics, or which medical procedure should be performed given a patient's condition. In several embodiments of the invention, the problem set 110 is selecting which questions to give a test taker given the test taker's performance on previous questions. The hypotheses 112 are candidate hypotheses, one or more of which most accurately describes the problem set 110 depending on the results of the tests 114. In many embodiments, the hypotheses 112 are the possible theories, economic models, medical procedures, or question sets for the example problems given above. Tests 114 are related to the hypotheses 112. In a number of embodiments, the tests 114 are run and the results are observed in order to determine the likelihood of a hypothesis in the hypotheses 112 based on the observed result of the tests 114. In several embodiments, the observations may be noiseless. In many embodiments, the observations are noisy. In accordance with embodiments of the invention, observations may be noisy when the results of tests 114 have errors, such as a measurement error or an incorrect answer is given for a test.

The problem set 110, hypotheses 112, and tests 114 are provided to an active learning decision engine 120. The active learning decision engine 120 performs processes in accordance with embodiments of the invention and selects hypotheses 130 which are the most likely to result in the correct answer to the problem set 110 based upon the hypotheses 112, and tests 114. In a number of embodiments, the active learning decision engine 120 only selects a single hypothesis 130 as the correct answer to the problem set 110. In several embodiments, the active learning decision engine 120 determines the selected hypotheses 130 by creating an ECD problem with the hypotheses 112 and using the tests 114 to solve the created ECD problem using EC2 methods.

Although specific examples of applications for the uses of active learning decision engines are given above, active learning decision engines may be utilized in accordance with embodiments of the invention in any number of appropriate applications. Additionally, active learning engines which have fewer or more inputs than described above may be utilized in accordance with embodiments of the invention. Systems and methods for active learning decision engines in accordance with embodiments of the invention are discussed below.

Active Learning Decision Engine

Figure 2:
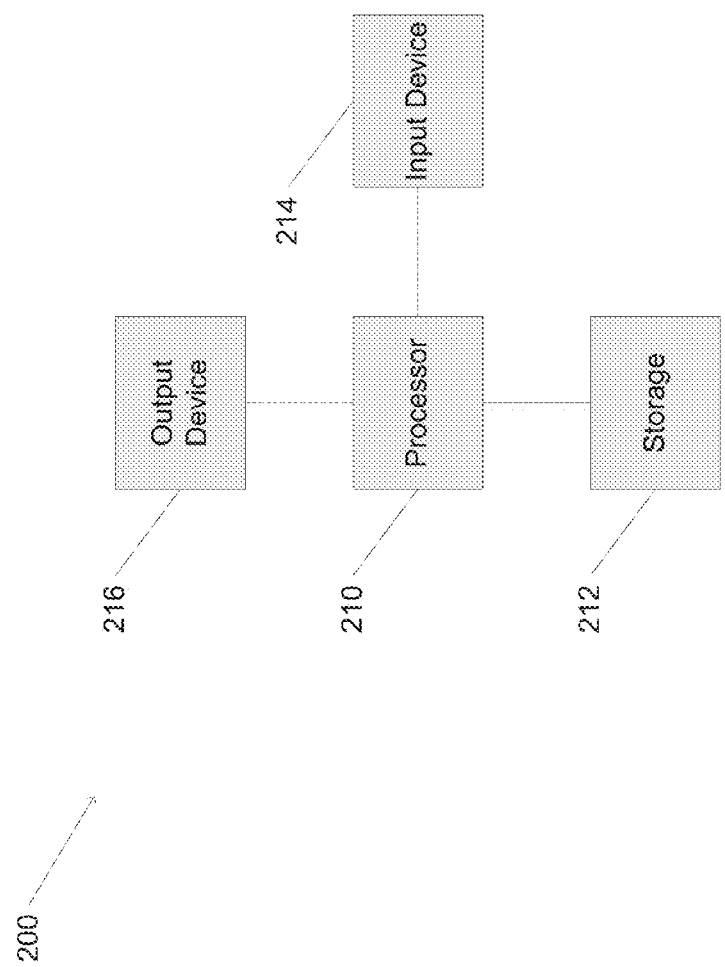
FIG. 2 is a system diagram of an active learning decision engine in accordance with an embodiment of the invention.

An active learning decision engine is a device capable of selecting a hypothesis or hypotheses which best solve a given problem set. An active learning decision engine in accordance with an embodiment of the invention is illustrated in FIG. 2. The active learning decision engine 200 includes a processor 210. In a number of embodiments, the processor 210 is configured to run EC2 methods in order to solve ECD problems. The processor 210 is connected to storage 212. In several embodiments, the storage 212 is configured to store problem sets, hypotheses, and tests. In many embodiments, the storage is configured to store selected hypotheses generated by the processor 210.

In several embodiments, the processor 210 is connected to an input device 214. In many embodiments, the input device may be a keyboard, mouse, touchscreen, network input, disk drive, or any other device capable of providing data to the processor 210. In a number of embodiments, two or more input devices may be connected to the processor 210. In several embodiments, the input device 214 provides data directly to the storage 212. Many embodiments of the invention include an output device 216 connected to the processor 210. In a number of embodiments, the output device is used to send data to another system, such as a network connection, or to display the data, such as a monitor. In several embodiments, two or more output devices 216 are connected to the processor 210.

Although a specific configuration of an active learning decision engine is illustrated in FIG. 2, many other configurations may be utilized in accordance with embodiments of the invention. Methods that can be utilized by active learning decision engines to determine the true hypotheses solving a problem set in accordance with embodiments of the invention are discussed below.

Equivalence Class Determination and Equivalence Class Edge Cutting

Figure 3:
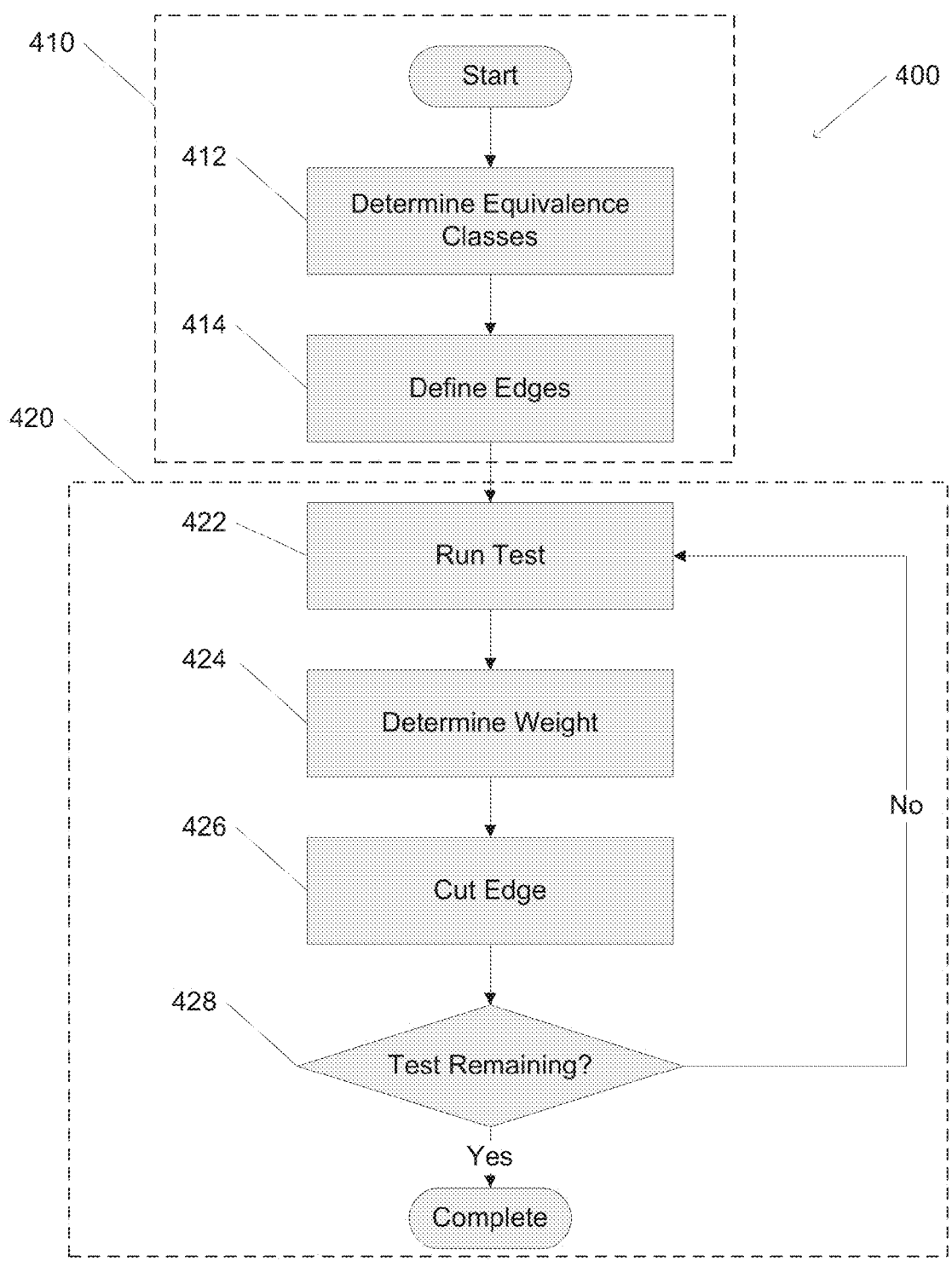
FIG. 3 is a flow chart illustrating a process for equivalence class determination and equivalence class edge cutting in accordance with an embodiment of the invention.

Active learning engines in accordance with embodiments of the invention partition hypotheses into a set of equivalence classes connected by weighted edges connecting hypotheses in different equivalence classes, where the tests associated with the various hypotheses are represented by the weighted edges. A method for determining equivalence classes and performing equivalence class edge cutting in accordance with an embodiment of the invention is illustrated in FIG. 3. The process 400 can conceptually be divided into the equivalence problem setup 410 and equivalence class edge cutting 420. Setting up the equivalence problem 410 involves determining (412) equivalence classes of hypotheses. In many embodiments, the equivalence classes are partitions of a set of hypotheses. Edges are defined (414). In a number of embodiments, the edges are weighted. In several embodiments, the edges represent-tests, where the observed result of the test results in one hypothesis becoming more likely to be the true hypothesis. In several embodiments, the true hypothesis is the hypothesis which best fits the available data. In many embodiments, the defined (414) edges only span hypotheses in different equivalence classes. In a number of embodiments, the defined (414) edges which only span hypotheses in different equivalence classes are a subset of all the tests available for the hypotheses.

Once the equivalence problem has been set up 410, the equivalence class edge cutting 420 begins. Equivalence class edge cutting 420 involves running (422) tests. The weight of the test is determined (424). In a number of embodiments, the determination (424) of the weight of a test is based on the expected cost of running the test. Edges are cut (426). In several embodiments, edges are cut (426) in a manner which greedily maximize the weight of the edges cut. If edge cutting tests remain (428), another test is run (422). The process 400 completes once no tests remain (428).

In many embodiments of the invention, equivalence class edge cutting 420 is adaptively submodular; that is, the expected marginal benefits of running test t can only decrease as more tests are observed. In a number of embodiments, equivalence class edge cutting 420 is strongly adaptively monotone, that is, observing test t does not increase the cost of performing equivalence class edge cutting 420.

By way of an example, the following formulas and examples may be utilized in an EC2 process 400 in accordance with embodiments of the invention. For a set of hypotheses $\mathcal{H}$ determining (412) equivalence classes involves partitioning $\mathcal{H}$ into a set of equivalence classes $\{\mathcal{H}_1, \mathcal{H}_2, \ldots, \mathcal{H}_m\}$ where $$\mathcal{H} = \cup_{i=1}^{m} \mathcal{H}_i.$$

A set of tests $\mathcal{T}\{1, 2, \ldots, n\}$ are defined, where running a test t incurs a cost c(t) and produces an outcome from the finite set of outcomes $\chi = \{1, 2, \ldots, 1\}$. Given hypotheses h and h', where h and h' are in $\mathcal{H}$ and h!=h', edges $\epsilon$ are defined (414) where $$\epsilon = \cup_{1 \leq i < j \leq m} \{\{h, h'\}: h \in \mathcal{H}_i, h' \in \mathcal{H}_j\}$$

Further given h" in $\mathcal{H}$, a test run (422) under the true hypothesis h is said to cut (426) edges $$\epsilon_t(h) := \{\{h',h''\} : h'(t) \neq h(t) \text{ or } h''(t) \neq h(t)\}.$$

The weight of an edge is determined (424) using the function $$\omega: \epsilon \to \mathbb{R}_{\geq 0} \text{ by } \omega(\{h,h'\}) := P(h) \cdot P(h').$$

Figure 5:
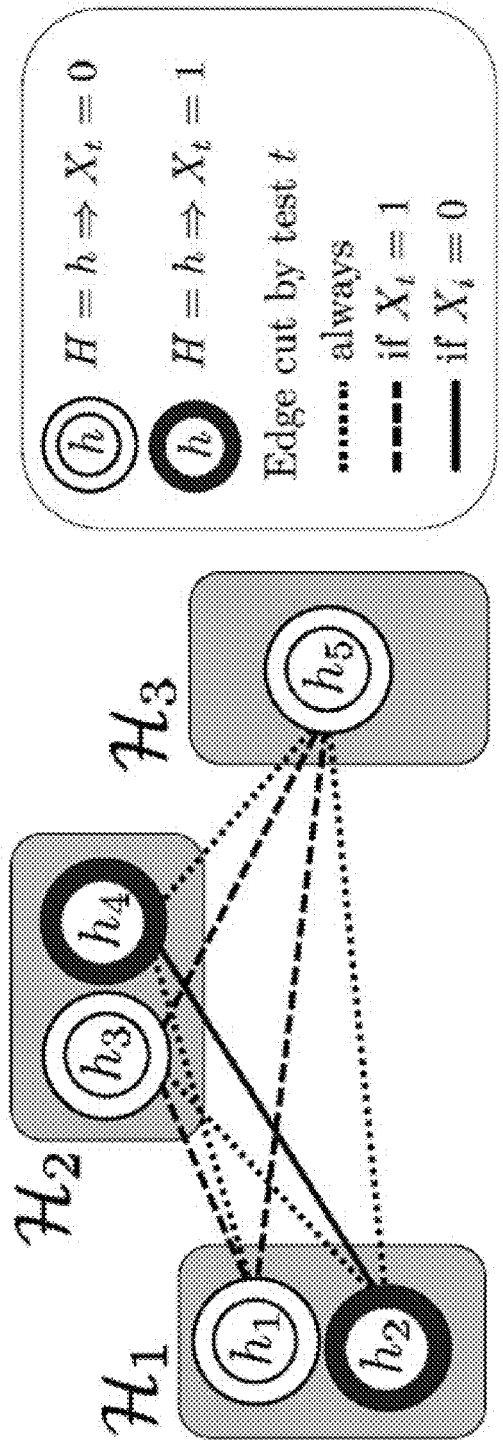
FIG. 5 is an illustration of the equivalence class determination problem in accordance with an embodiment of the invention.

Once there are no tests remaining (428), for observations $x_\mathcal{A}$ $$V(x_\mathcal{A}) \subseteq \mathcal{H}_i$$

for some i, where V is the version space associated with $x_\mathcal{A}$. In a number of embodiments, the version space is a set of hypotheses that are consistent with observed data. As further example, an illustration of the equivalence class determination problem along with an equivalence class edge cutting process in accordance with an embodiment of the invention is shown in FIG. 5.

In cases with noisy observations, in general there will be uncertainty regarding the true hypothesis after determining $x_\mathcal{A}$. In many embodiments of the invention, the goal is to make effective decisions d where $d \in \mathcal{D}$, where $\mathcal{D}$ is a set of possible decisions which can be made. Effective decisions are made by choosing, after observing $x_A$, a decision $d^*$, which minimizes the risk of loss l(d, h). In several embodiments, $$d^* \in \arg\min_d \mathbb{E}_H[l(d,H)|x_A].$$

Effective decisions can also be used to minimize more complex functions of the loss distribution. By adjusting the expectation operator $\mathbb{E}_H$, you can create a decision maker which makes decisions representing a variety of risks, including risk-prone decisions and risk-averse decisions.

The issue of noisy observations can be integrated into the ECD problem by minimizing the risk associated with a hypothesis $\mathcal{H}$ and an observation $x_T$ for each decision made. In a number of embodiments, for each decision $d \in \mathcal{D}$, $$\mathcal{H}_d := \{x_T : d = \arg\min_{d'} \mathbb{E}_H[l(d', H) | x_T]\}.$$

In many embodiments, ties are broken arbitrarily if multiple decisions minimize the risk for a particular observation $x_T$ Although specific methods for determining equivalence classes and performing equivalence class edge cutting using active learning engines are described above, other techniques for determining equivalence classes and performing equivalence class edge cutting may be utilized by using active learning engines in accordance with embodiments of the invention. Methods for solving the ECD problem using an active learning engine in accordance with embodiments of the invention are discussed below.

The EffECXtive Method

Figure 4:
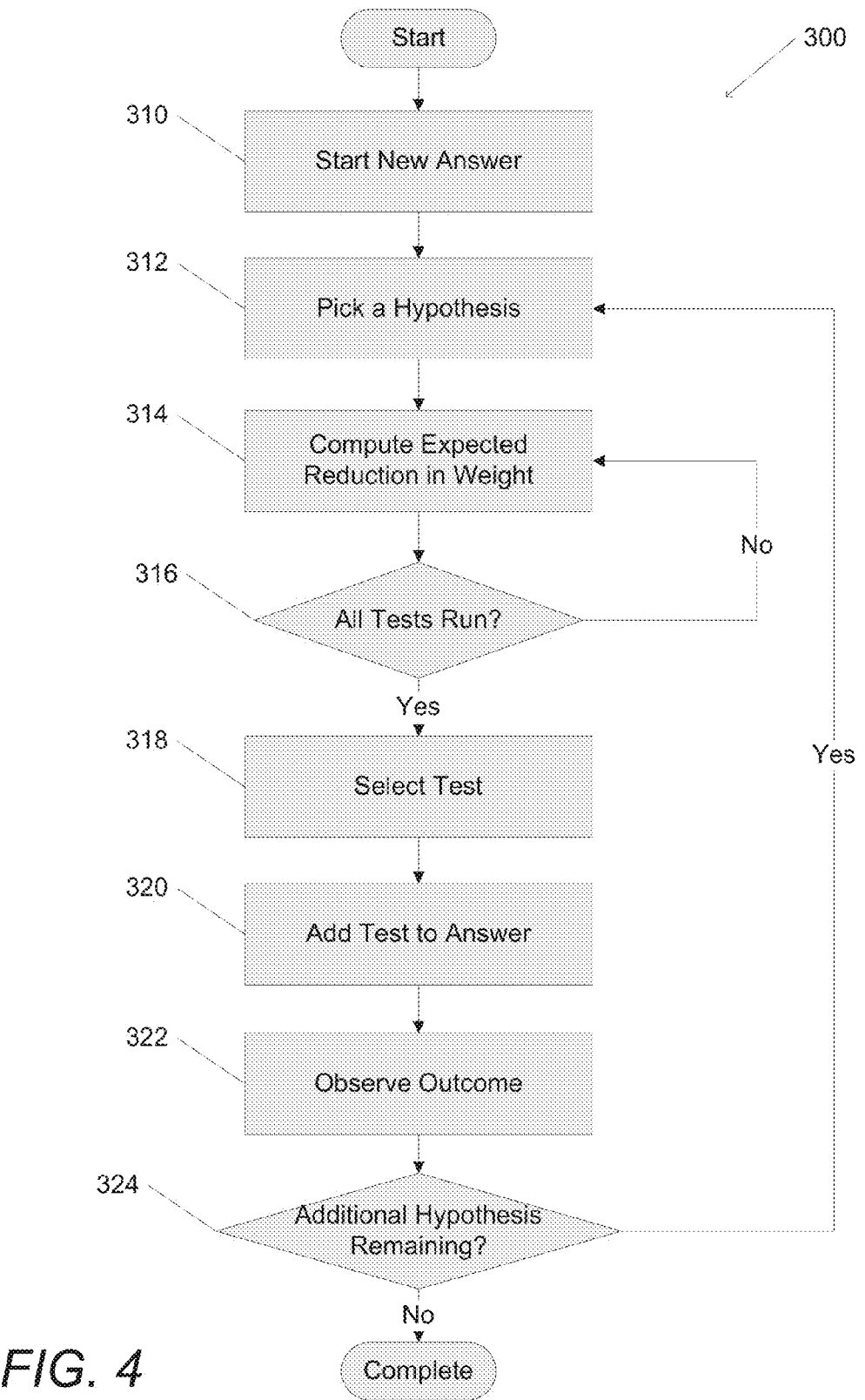
FIG. 4 is a flow chart illustrating a process for approximating equivalence class edge cutting with noisy observations in accordance with an embodiment of the invention.

In edge cutting determination cases with an exponential number of equivalence classes, such as in cases with noisy observations, the EC2 method may not be effective in solving the ECD problem. In several embodiments of the invention, the Efficient Edge Cutting approXimate Objective (EffECXtive) method can be utilized to solve the ECD problem in these cases. An implementation of the EffECXtive method in accordance with an embodiment of the invention is illustrated in FIG. 4. The EffECXtive method is designed to greedily maximize the expected reduction in weight from the prior to the posterior distribution. The process 300 includes starting (310) a new answer. A hypothesis is picked (312) from a set of hypotheses. In a number of embodiments, the hypothesis picked (312) is in an equivalence class determined by choosing hypotheses based on decisions, which minimize the risk of loss due to noisy observations. A test is selected from the set of tests associated with the selected (312) hypothesis and the expected reduction in weight is computed (314) based on the selected test. In many embodiments, the tests available to be selected for a selected (312) hypothesis are a subset of all available tests. If all tests associated with a hypothesis have not been run (316), the computation (314) of expected reductions in weight for each remaining test is repeated for the remaining tests.

If all tests have been run (316), a test is selected (318). In many embodiments, the selected (318) test maximizes the expected reduction in weight. The selected (318) test is added (320) to the answer. The outcome of the test is observed (322). If additional hypotheses remain (324), another hypothesis is picked (312). The process ends when no additional hypotheses remain (324).

In a number of embodiments, the weight of edges between distinct equivalence classes $\mathcal{H}_i$ and $\mathcal{H}_j$ is $$w(\mathcal{H}_i \times \mathcal{H}_j) = \sum_{x_T \in \mathcal{H}_i, x'_T \in \mathcal{H}_j} P(x_T) P(x'_T)$$

$$= \left(\sum_{x_T \in \mathcal{H}_i} P(x_T)\right)\left(\sum_{x'_T \in \mathcal{H}_j} P(x'_T)\right)$$

$$= P(X_T \in \mathcal{H}_i) P(X_T \in \mathcal{H}_j).$$

In several embodiments, the expected reduction in weight from the prior to the posterior distribution is calculated (314) as $$\Delta_{EFF}(t | x_\mathcal{A}) := \left[\sum_x P(X_t = x | x_\mathcal{A})\left(\sum_i P(h_i | x_\mathcal{A}, X_t = x)^2\right)\right] - \sum_i P(h_i | x_\mathcal{A})^2$$

where $\Delta_{Eff}$ is interpreted as the information gained by running test t. In many embodiments, $\Delta_{Eff}$ is a monotonically increasing function, in that the expected reduction in weight from the prior to the posterior distribution does not decrease as more tests are observed.

A specific implementation of the EffECXtive process that can be implemented on an active learning engine is describe above, however, other implementations may be utilized in accordance with embodiments of the invention. Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive. Accordingly, the scope of the invention should be determined not by the embodiments illustrated, but by the appended claims and their equivalents.

What is claimed is:

1. An active learning decision engine, comprising:
   hypotheses storage configured to store hypotheses, where a hypothesis comprises a possible solution to a problem set;
   equivalence class storage configured to store equivalence classes, where an equivalence class comprises at least one hypothesis in the hypotheses having a shared class of solution to the problem set;

test storage configured to store a set of tests, where a test in the set of tests comprise a set of related hypotheses, a test cost, and a test outcome;

observation storage configured to store observations, where an observation comprises a test result observed from the running of a test in the set of tests stored in the test storage;

edge storage configured to store a set of edges, where an edge comprises a test related to a first hypothesis and a second hypothesis in the hypotheses, where the first hypothesis and the second hypothesis are in distinct equivalence classes; and a processor, where the processor is configured to:
determine a plurality of equivalence classes containing one or more hypotheses based on the problem set, where the plurality of equivalence classes are a partition of the hypotheses in the hypotheses storage based on the class of the hypotheses and the possible solution to the problem set described by the hypotheses;
determine a set of edges utilizing the tests, where the edges in the set of edges span equivalence classes in the plurality of equivalence classes;
determine weights for the determined edges in the set of edges, where the weight for an edge in the set of edges is a measure of the test cost associated with running the test represented by the edge;
select a test based on the determined weights;
perform the selected test to generate at least one test result describing the likelihood that at least one hypothesis related to the test is a solution to the problem set;
observe the results of the performed test, where the observed results for the performed test comprise the at least one test result associated with the performed test;
remove edges from the set of edges based on the observed results; and
select at least one hypothesis from the one or more hypotheses using the set of edges, where the selected at least one hypothesis is consistent with the observed results describing the likelihood that the selected at least one hypothesis is a solution to the problem set.

2. The active learning decision engine of claim 1, wherein the processor is configured to select tests based on the determined weights by greedily maximizing the determined weights of the selected tests.

3. The active learning decision engine of claim 2, wherein greedily maximizing the determined weights of the selected tests is strongly adaptively monotone.

4. The active learning decision engine of claim 2, wherein greedily maximizing the determined weights of the selected tests is adaptively submodular.

5. The active learning decision engine of claim 1, wherein the processor is configured to select tests to minimize the expected cost of the tests.

6. The active learning decision engine of claim 1, wherein the observations of performed tests are noisy observations.

7. The active learning decision engine of claim 6, wherein the processor is configured to select a hypothesis from the set of hypothesis based on the observations of performed tests by minimizing the expected risk of loss of selecting the hypothesis based on the observed outcomes of the performed tests.

8. The active learning decision engine of claim 6, wherein the processor is configured to determine the plurality of equivalence classes using the observations of performed tests.

9. The active learning decision engine of claim 8, wherein the performed tests related to the hypotheses in the same equivalence class lead to the same minimized expected risk of loss.

10. A method for selecting a hypothesis from a set of hypotheses using an active learning decision engine, comprising:
determining a plurality of equivalence classes using the active learning decision engine, where an equivalence class contains one or more hypotheses, where:
a hypothesis comprises a possible solution to a problem set; and
an equivalence class comprises at least one hypothesis in the hypotheses having a shared class of solution to the problem set;
determining a set of weighted edges using the active learning decision engine, where the weighted edges connect hypotheses in different equivalence classes and the weighted edges represent tests related to the connected hypotheses, where:
a test comprises a test cost and a test outcome; and
the weight for an edge in the set of edges is a measure of the test cost associated with running the test represented by the edge;
removing weighted edges from the set of weighted edges which maximizes the computed expected reduction in weight using the active learning decision engine;
observing the outcome of remaining tests associated with the weighted edges using the active learning decision engine, where an observed outcome comprises a test result observed from the running of a test; and
selecting at least one hypothesis from the set of hypotheses based on the observed outcome using the active learning decision engine, where the selected hypothesis is consistent with the observed results describing the likelihood that the selected at least one hypothesis is a solution to the problem set.

11. The method of claim 10, wherein removing weighted edges from the set of weighted edges greedily maximizes the weights of the weighted edges that are removed.

12. The method of claim 11, wherein greedily maximizing the weights of the weighted edges representing the selected tests is strongly adaptively monotone.

13. The method of claim 11, wherein greedily maximizing the weights of the weighted edges representing the selected tests is adaptively submodular.

14. The method of claim 10, wherein the computed expected reduction in weight of the weighted edges removed from the set of weighted edges is a monotonically increasing function.

15. The method of claim 10, wherein the observed result of the selected test is a noisy observation.

16. The method of claim 15, wherein selecting a hypothesis from the set of hypothesis based on the observed outcome involves minimizing the expected risk of loss of selecting the hypothesis based on the observed outcome of the selected test.

17. The method of claim 15, wherein determining equivalence classes containing one or more hypotheses includes determining the equivalence classes using the outcomes of the tests related to the one or more hypotheses.

18. The method of claim 17, wherein the tests related to the hypotheses in the same equivalence class lead to the same minimized expected risk of loss.

19. A method for selecting hypothesis from a set of hypotheses determined using observations of selected tests using an active learning decision engine comprising:

selecting a hypothesis from the set of hypotheses using the active learning decision engine, where a hypothesis comprises a possible solution to a problem set;

for each test related to the selected hypothesis:
  selecting a test, comprising a test cost and a test outcome, to run using the active learning decision engine, where the test is related to the selected hypothesis;
  running the selected test, where running the selected test incurs a cost based on the test cost for the selected test;
  observing the result of the selected test using the active learning decision engine, where the observed result is based on the test outcome for the selected test and describes the likelihood that at least one hypothesis related to the test is a solution to the problem set; and
  computing the expected reduction in weight based on the observed result using the active learning decision engine;

selecting the test which maximizes the computed expected reduction in weight using the active learning decision engine;

adding the selected test to the answer using the active learning decision engine;

observing the outcome of the selected test using the active learning decision engine; and selecting at least one hypothesis from the set of hypotheses using the observed outcome using the active learning decision engine, where the selected at least one hypothesis is consistent with the observed results describing the likelihood that the selected at least one hypothesis is a solution to the problem set.

20. The method of claim 19, wherein selecting the test which maximizes the computed expected reduction in weight greedily maximizes the computed expected reduction in weight.

21. The method of claim 20, wherein greedily maximizing the computed expected reduction in weight is strongly adaptively monotone.

22. The method of claim 20, wherein greedily maximizing the computed expected reduction in weight is adaptively submodular.

23. The method of claim 19, wherein computing the expected reduction in weight is a monotonically increasing function.

24. The method of claim 19, wherein observing the result of the selected test is a noisy observation.

* * * * *